United States Patent [19]

Sakurai et al.

[11] Patent Number: 5,783,515

[45] Date of Patent: *Jul. 21, 1998

[54] CATALYST FOR TREATING EXHAUST GASES CONTAINING DIOXINES, PRODUCTION PROCESS FOR THE CATALYST AND METHOD OF TREATING THE EXHAUST GASES

[75] Inventors: Toshihiko Sakurai; Toshihiko Iwasaki; Eiichi Shibuya, all of Tokyo, Japan

[73] Assignees: N.E. Chemcat Corporation; NKK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 580,959

[22] Filed: Dec. 27, 1995

Related U.S. Application Data

[63] Continuation of Ser. No. 310,090, Sep. 22, 1994, abandoned.

[30] Foreign Application Priority Data

Sep. 24, 1993 [JP] Japan ..................... 5-261723

[51] Int. Cl.$^6$ ..................................... B01J 21/02
[52] U.S. Cl. ..................... 502/207; 502/245; 502/330
[58] Field of Search ..................... 502/67, 207, 245, 502/330

[56] References Cited

U.S. PATENT DOCUMENTS

| 5,164,350 | 11/1992 | Abe et al. | 502/66 |
| 5,171,728 | 12/1992 | Sakurai et al. | 502/178 |
| 5,346,874 | 9/1994 | Clark et al. | 502/207 |

FOREIGN PATENT DOCUMENTS 6210171  8/1994  Japan.

*Primary Examiner*—Shrive Beck
*Assistant Examiner*—Timothy Meeks
*Attorney, Agent, or Firm*—Breiner & Breiner

[57] ABSTRACT

A catalyst including a first catalyst ingredient which is at least one element selected from a group consisting of Pt, Pd and Ir, or oxides thereof; and further able to include at least one element selected from a group consisting of Au, Ag, Cu, Fe, Sb, Se, Te and Ta, or oxides thereof, as a second catalyst ingredient, carried on at least one of a silica-boria-alumina composite oxide or a zeolite with a silica-to-alumina molar ratio of more than 30, in amounts of from 0.1 to 10 g of the first catalyst ingredient and from 0.01 to 5 g of the second catalyst ingredient based on one liter of the catalyst with the second to first catalyst ingredient weight ratio being less than 1. The catalyst is used for treating exhaust gases by bringing the exhaust gases containing HCl and dioxines into contact with the catalyst to thereby eliminate the HCl and dioxines from the exhaust gases by oxidative decomposition while suppressing the subsequent formation of dioxines from precursors for the dioxines present in the exhaust gases.

8 Claims, 5 Drawing Sheets

Fig. 2

Sp: Measuring point

CATALYST FOR TREATING EXHAUST GASES CONTAINING DIOXINES, PRODUCTION PROCESS FOR THE CATALYST AND METHOD OF TREATING THE EXHAUST GASES

This is a continuation of application Ser. No. 08/310,090 filed on Sep. 22, 1994, now abandoned.

FIELD OF THE INVENTION

The present invention concerns elimination of dioxines in exhaust gases containing HCl. More in particular, the invention relates to (1) a long life catalyst for treating exhaust gases containing dioxines which oxidatively decompose to reduce polychlorobenzo-para-dioxines and polychlorobenzofurans contained in exhaust gases at a concentration of dioxines of less than 10 ng/Nm$^3$, converted as the international toxicity equivalent concentration; (2) a process for producing a catalyst for treating exhaust gases containing dioxines by supporting a catalyst on a carrier substrate, and (3) a method of treating exhaust gases by using the catalyst. For example, exhaust gases from municipal waste incinerators are improved in combustion performance by oxidative decomposition at a temperature within a range of from 150° to 280° C. to eliminate dioxines initially present in the exhaust gases while suppressing formation of dioxines from dioxine precursors contained in the exhaust gases, i.e., formed products by unburnt residual carbon, oxygen (this phenomenon is called "de novo" synthesis), chlorobenzenes, and chlorophenol.

BACKGROUND OF THE INVENTION

Exhaust gases generated, for example, from incineration facilities for disposing of industrial wastes and municipal wastes, steel-making plants and metal refining industries, contain slight amounts of toxic organic chloro-compounds, such as dioxines, PCB and chlorophenol, in addition to toxic substances, such as $SO_x$, $NO_x$, HCl and cyan. A technique for removing these compounds have been under development from the viewpoint of human health and environmental protection.

The substances referred to as dioxines are compounds of polychlorodibenzo-para-dioxines (PCDDs) and polychlorodibenzofurans (PCDFs) and include from dichlorides to octachlorides depending on the number of chlorine atoms and their isomers which include as many as 75 types for PCDDs and 135 types for PCDFs. Among them, tetrachlorodibenzo dioxines ($T_4$CDDs) are known as the most toxic. Further, since dioxines are highly stable water-insoluble substances and their toxicity is substantially permanent, they are considered to be the most significant chemical substance that causes environmental pollution.

It is known that dioxines are formed by the reaction of unburnt residual carbon, oxygen and chlorides (such as metal chlorides) in exhaust gases and that they are formed in a certain temperature range from organic chlorine compounds, such as chlorobenzenes and chlorophenols, in exhaust gases discharged from incinerators as precursors under the catalytic effects of various elements in fly ash in incineration plants. However, each of these are effects of the fly ash present together in the exhaust gases and it has not yet been reported that the dioxines are formed by the effect of catalysts disposed in the facilities for treating the exhaust gases.

In the present description, various substances contained in exhaust gases to be treated and having a possibility of being converted into dioxines are collectively referred to as "precursors for the dioxines".

A guideline regarding the operation of incineration plants was issued by the Ministry of Health and Welfare of Japan in December, 1990 setting for newly installed incineration plants, a gas temperature of less than 200° C. at the inlet of a dust collector so that the concentration of dioxines in existing gases is reduced to less than 0.5 ng/Nm$^3$, converted as the international toxicity equivalent concentration. Further, existing incineration plants are required to be operated so that the gas temperature at the inlet of the dust collector is as low as possible within a range of from 250° to 280° C. so that the concentration of the dioxines is reduced to less than 1/10 of the usual concentration.

On the other hand, in reducing organic chlorine compounds as a precursor for the dioxines in incineration plants, it is considered most important to conduct sufficient combustion in the incineration plants. For instance, in modern municipal waste incineration plants, reduction of the dioxines in the exhaust gases has been advanced considerably through the mode of combustion and it is now possible to reduce the concentration to less than several tens ng/Nm$^3$, converted as the international toxicity equivalent concentration. However, there is a limit on reduction through combustion and it is sometimes impossible to maintain the concentration of the dioxines in the exhaust gases at the outlet to less than 0.5 ng/Nm$^3$, converted as the international toxicity equivalent concentration, as specified by the guidelines of the Ministry of Health and Welfare concerning incineration plant operation. In view of the above, it is now necessary to provide a system for eliminating toxic organic chlorine compounds, including the dioxines, in the exhaust gases downstream of incinerators. As an elimination system, the following two systems have been mainly studied in recent years. One is an adsorption elimination system involving elimination by adsorption using an adsorption layer, for example, of activated carbon. The other system is an elimination system by decomposition on a catalyst. For the latter system, there is proposed, for example, a system of decomposition to eliminate dioxines together with $NO_x$ by passing through a fixed bed-type denitrating honeycomb catalyst layer, and an elimination system of fixed bed-type oxidative decomposition by passing through a denitrating catalyst layer and a platinum group element-titania-type honeycomb catalyst.

As a catalyst, a denitrating catalyst comprising vanadium pentoxide, tungsten oxide and titania, or a catalyst carrying a platinum group element on the denitrating catalyst has been disclosed, for example, in International Application PCT/JP92/00552 (Japanese Patent Application Hei 3-128464 and Japanese Patent Laid-Open Hei 2-35914). Further, Japanese Patent Laid-Open Hei 3-8415 discloses as a method of treating exhaust gases, an oxidative elimination technique of eliminating toxic organic chlorine compounds, such as polychlorobenzo dioxines and polychlorodibenzofurans contained, for example, in exhaust gases from incineration plants using a catalyst at a working temperature higher than 250° C. Japanese Patent Laid-Open Hei 4-118027 discloses a similar method of treating exhaust gases at 150°–350° C. and Japanese Patent Laid-Open Hei 5-154345 discloses an active filter element using an oxide catalyst selected from a group consisting of elements having element numbers of 23 to 30, as well as W and Mo.

However, in an adsorption elimination system, the space velocity has to be lowered since the concentration of an object to be treated is extremely low which makes the apparatus used very large. Additionally, there is a problem regarding regeneration of activated carbon wastes and waste disposal. Further, a system using a catalyst involves various problems such as the following: (1) since gases leaving a dust collector at an inlet temperature of the dust collector (as required in the guidelines of the Ministry of Health and Welfare) are at a low temperature, oxidation activity is insufficient resulting in a poor purification ratio; (2) it has been found that as the concentration of dioxines in exhaust gases to be treated lowers to less than several $ng/Nm^3$, converted as the international toxicity equivalent concentration, elimination of the dioxines already present in the gases becomes difficult depending on the treating temperature and the catalyst ingredient used for the treatment and, in addition, dioxines are newly formed in the gases by the catalytic effect so that the concentration of the dioxines is sometimes higher in the outlet gases than the concentration of the dioxines in the inlet gases; (3) the catalysts disclosed in International Patent Application PCT/IT92/00552 (Japanese Patent Application Hei 3-128464) and Japanese Patent Laid-Open Hei 2-35914, involve a drawback in that dioxines are newly formed from dioxine precursors present at a concentration of about several thousand times as high as that of dioxines by the catalytic effect in a low temperature region of lower than 280° C., particularly, lower than 250° C., so that the concentration of dioxines in the outlet gases is higher than the concentration of dioxines in the inlet gases, and further the catalyst has poor durability at a low temperature to substances such as HCl, $SO_x$, Hg vapor and organic chlorine compound contained in the gases to be treated and act as a catalyst poison resulting in a failure to maintain a high activity for a long time; (4) in the elimination method, for example, the practical working life has not yet been confirmed; (5) Japanese Patent Laid-Open Hei 3-8415 can not be considered as a method for treating exhaust gases at a temperature, possibly, lower than 250° C., in view of the guidelines issued from the Ministry of Health and Welfare regarding incinerators for preventing generation of dioxines and involves a problem incapable of satisfying the guidelines; and (6) Japanese Patent Laid-Open Hei 4-118027 and Hei 5-154345 involve a practical problem in that no consideration is given to the lowering of the elimination effect or provision of an adverse effect if the concentration of the dioxines is less than 10 $ng/Nm^3$, converted as the international toxicity equivalent concentration, at a temperature lower than 280° C., particularly, lower than 250° C. as described above, since no data for the catalyst life is known and no practical technique has yet been completed.

OBJECTS OF THE INVENTION

It is an object of the present invention to provide a catalyst for treating exhaust gases generated from the burning disposal of various kinds of industrial wastes wherein the exhaust gases contain precursors of dioxines, such as chlorobenzene and chlorophenol, in the presence of HCl; and exhaust gases from metal refining and exhaust gases from chemical plants wherein the exhaust gases contain organic chlorine compounds. The catalyst can decompose to eliminate dioxines already present in the exhaust gases, while also suppressing the formation of dioxines from precursors in the catalyst layer at a low treating temperature, which is within the guidelines of the Ministry of Health and Welfare, thereby reducing the concentration of dioxines in outlet gases to less than 0.5 $ng/Nm^3$, desirably, less than 0.1 $ng/Nm^3$, converted as the international toxicity equivalent concentration which is an international aimed value. Other objects of the invention involve providing a process for production of the catalyst as well as providing an exhaust gas treating method.

The present inventors have conducted a study to solve the foregoing problems and to attain the objects described above. As a result, the present invention is based on the finding that the objects can be attained by supporting a predetermined active ingredient in a predetermined amount on a predetermined carrier.

SUMMARY OF THE INVENTION

A first aspect of the present invention resides in providing a catalyst for treating exhaust gases containing dioxines, wherein the catalyst includes at least one element selected from a group consisting of Pt, Pd and Ir, or oxides thereof, and is supported as a catalyst ingredient in an amount of 0.1 to 10 g per one liter of the catalyst on at least one of a silica-boria-alumina composite oxide or a zeolite with a silica-to-alumina molar ratio of greater than 30.

A second aspect of the present invention resides in providing a catalyst for treating exhaust gases containing dioxines wherein the catalyst includes at least one element selected from a group consisting of Pt, Pd and Ir, or oxides thereof, as a first catalyst ingredient, and at least one element selected from a group consisting of Au, Ag, Cu, Fe, Sb, Se, Te and Ta, as a second catalyst ingredient, and which are supported in an amount of 0.1 to 10 g of the first catalyst ingredient per one liter of the catalyst and 0.01 to 5 g of the second catalyst ingredient per one liter of the catalyst on at least one of a silica-boria-alumina composite oxide or a zeolite with a silica-to-alumina molar ratio of more than 30, and further wherein the second ingredient is present in relation to the first ingredient of the catalyst in a carrying ratio of less than 1 on a weight basis.

A third aspect of the present invention resides in providing a process for producing a catalyst for treating exhaust gases containing dioxines. The process comprises spraying or dripping a homogeneous mixed solution or homogeneous liquid dispersion of a raw material of the first catalyst ingredient, or the first catalyst ingredient and the second catalyst ingredient, to at least one of the powders of a silica-boria-alumina composite oxide or a zeolite with a silica-to-alumina molar ratio of more than 30 while stirring to thereby support the catalyst ingredient, and followed by slurrifying and depositing the resulting material on a carrier substrate.

A fourth aspect of the present invention resides in providing a process for producing a catalyst for treating exhaust gases containing dioxines. The process comprises slurrifying at least one of the powders of a silica-boria-alumina composite oxide or a zeolite with a silica-to-alumina molar ratio of more than 30; coating the slurry on the surface of a carrier substrate; drying and baking the same to complete desposition; subjecting the carrier substrate to immersion, liquid absorption or ion exchange with a solution of a raw material for the first catalyst ingredient, or the first catalyst ingredient and the second catalyst ingredient successively or simultaneously; and then drying and baking to thereby provide a substrate carrying the catalyst ingredient(s).

A fifth aspect of the present invention resides in providing a method of treating exhaust gases. The method comprises bringing exhaust gases containing HCl and dioxines at a concentration of less than 10 $ng/Nm^3$, converted as the international toxicity equivalent concentration, at a treating temperature within a range of from 150° C. to 280°0 C. into contact with a catalyst comprising at least one element selected from a group consisting of Pt, Pd and Ir, or oxides thereof, supported as a catalyst ingredient on at least one of a silica-boria-alumina composite oxide or a zeolite with a silica-to-alumina molar ratio of more than 30, and deposited on a carrier substrate, and oxidatively decomposing the catalyst to eliminate dioxines contained in the exhaust gases while suppressing subsequent formation of dioxines from precursors for dioxines present in the exhaust gases.

A sixth aspect of the present invention resides in providing another method of treating exhaust gases. The method comprises bringing exhaust gases containing HCl and dioxines at a concentration of less than 10 ng/Nm$^3$, converted as the international toxicity equivalent concentration, at a treating temperature within a range of from 150° C. to 280° C. into contact with a catalyst comprising at least one element selected from a group consisting of Pt, Pd and Ir, or oxides thereof, as a first catalyst ingredient and at least one element selected from a group consisting of Au, Ag, Cu, Fe, Sb, Se, Te and Ta, and oxides thereof, as a second catalyst ingredient, carried on at least one of a silica-boria-alumina composite oxide or a zeolite with a silica-to-alumina molar ratio of more than 30, and deposited on a carrier substrate; and oxidatively decomposing the catalyst to eliminate dioxines contained in the exhaust gases while suppressing subsequent formation of dioxines from precursors for dioxines present together in the exhaust gases.

The catalyst according to the present invention comprises a surface coating ingredient and a catalyst ingredient. The surface coating ingredient comprises a silica-boria-alumina composite oxide or a zeolite with a silica-to-alumina molar ratio of more than 30.

The carrier substrate for the catalyst can be of any shape, such as spherical, pelletized, extruded, plateaus, cylindrical, or lattice-like shape, as well as being a support having an integral structure or filter-like configuration. In a case where dust is contained in a great amount in the exhaust gases, such as from incineration plants, a support having an integral structure or a filter-like structure is preferably used.

The catalyst is a two-component catalyst comprising a first catalyst ingredient selected from a group consisting of elements of Pt, Pd and Ir, or oxides thereof, and a second catalyst ingredient selected from a group consisting of elements of Au, Ag, Cu, Fe, Sb, Se, Te, Ta, or oxides thereof. Further, a catalyst comprising at least one element selected from a group consisting of Pt, Pd and Ir, or oxides thereof, supported on a specified surface coating ingredient can also provide such characteristics.

In the case of depositing the catalyst ingredient on a carrier substrate, such as a support having an integral structure, the concentration of the first catalyst ingredient is from 0.1 to 10 g per one liter volume of the complete catalyst, the concentration of the second catalyst ingredient is from 0.01 to 5 g per one liter of the complete catalyst, and the weight ratio of the second catalyst ingredient to the first catalyst ingredient is less than 1. Further, in the case of coating the catalyst on the surface of a filtration material for a bag filter, the first catalyst ingredient is at least one element selected from a group consisting of Pt, Pd and Ir, or oxides thereof, and is carried in an amount of from 0.05 to 5% by weight based on the weight of the filtration material with the catalyst for a complete bag filter, while the second catalyst ingredient comprises at least one element selected from a group consisting of Au, Ag, Cu, Fe, Sb, Se, Te and Ta, or oxides thereof, and is supported in an amount from 0.01 to 1% by weight based on the weight of the filtration material with the catalyst for a complete bag filter. The weight ratio of the second catalyst ingredient to the first catalyst ingredient is not more than 1. The range for the concentration of the catalyst ingredient of the catalyst using only the first catalyst ingredient is from 0.1 to 10 g based on one liter volume of the complete catalyst in the case of depositing the catalyst on a carrier substrate such as a support having an integral structure, while the concentration of the catalyst ingredient in the case of coating the catalyst on the surface of a filtration material for a bag filter is from 0.05 to 5% by weight.

The catalyst according to the present invention can be prepared, for example, by (a) a method of spraying or dripping a homogeneous mixed solution or homogeneous liquid dispersion of a raw material for the first catalyst ingredient and the second catalyst ingredient onto at least one of the powders of silica-boria-alumina composite oxide or a zeolite with a silica-to-alumina molar ratio of more than 30, while stirring; drying at a temperature of from 50° to 200° C.; and then calcining at a temperature of from 200° to 600° C. to thereby support the catalyst ingredient; (b) a method of slurrifying at least one of the powders of a silica-boria-alumina composite oxide or zeolite with a silica-to-alumina molar ratio of more than 30; coating the slurry on the surface of a carrier substrate, such as a support having an integral structure or a filtration material for a bag filter; drying at a temperature of from 100° to 200° C.; baking at a temperature of from 200° to 600° C. to complete deposition; subjecting the carrier substrate to immersion or liquid absorption with solutions of raw materials for the first catalyst ingredient and the second catalyst ingredient successively, or with a homogeneous mixed solution of raw materials for the first catalyst ingredient and the second catalyst ingredient, at a temperature ranging from room temperature to 98° C., or carrying elements through ion exchange to a carrier substrate coated with a zeolite powder with a silica-to-alumina molar ratio of more than 30; drying at a temperature within a range of from room temperature to 200° C.; and calcining at a temperature within a range of from 200° to 600° C., thereby completing the carriage of the catalyst ingredient; or (c) a method of immersing or mixing a silica-boria-alumina composite oxide or zeolite with a silica-to-alumina molar ratio of more than 30 to a homogeneous mixed solution or homogeneous liquid dispersion of the raw materials for the first catalyst ingredient and the second catalyst ingredient; filtering and cleaning; slurrifying and coating onto a carrier substrate, such as a support having an integral structure or a filtration material for a bag filter; drying at a temperature of from 50° to 200° C.; and calcining at a temperature of from 200° to 600° C. to thereby carry the catalyst ingredient; or (d) a method of immersing at least one of zeolite with a silica-to-alumina molar ratio of more than 30 to a homogeneously mixed solution of raw materials for the first catalyst ingredient and the second catalyst ingredient; carrying the catalyst ingredient through ion exchange in the liquid; filtering, cleaning and slurrifying followed by coating onto a carrier substrate, such as a support having an integral structure or a filtration material for a bag filter; drying at a temperature of from 50° to 200° C.; and calcining at a temperature of from 200° to 600° C. to thereby form a catalyst.

As an example of a method of coating the catalyst onto a carrier substrate, such as a support having an integral structure or a filtration material for a bag filter, there is noted a method of coating a carrier substrate with a catalyst slurry in which the first catalyst ingredient and the second catalyst ingredient are carried onto at least one of the powders of a silica-boria-alumina composite oxide or a zeolite with a silica-to-alumina molar ratio of more than 30. Referring more specifically to the coating method, the powdery catalyst is introduced together with purified water and an acid into a ball mill and slurrified by pulverization to a grain size for the mixture of 0.1 to 10 µm. The acid used can be a conventional mineral acid or an organic acid (acetic acid being particularly preferred) and can be used in an amount of 20 to 100 ml per 1 kg of the coating layer solid content comprising at least one powdery catalyst of a silica-boria-alumina composite oxide or a zeolite. The resultant slurry is incorporated with purified water and adjusted to a predetermined specific gravity, for example, a slurry of 1.20–1.60 g/ml. Subsequently, a carrier substrate is dipped into the slurry for 5 to 60 secs., taken out, excess slurry removed with an air stream or the like, dried at 100°–200° C., and calcined at a temperature of from 200° to 600° C. to complete the coating. The amount deposited after completion of the coating per one liter of the carrier substrate is from 30 to 160 g, although variation is possible depending on the number of cells and the structure of the carrier substrate.

The catalyst according to the present invention can also be produced by an electroless plating method. A process for producing a catalyst by an electroless plating method is carried out by preparing a slurry in the same manner as described above by using a zeolite with a silica-to-alumina molar ratio of more than 30, coating the slurry onto a support having an integral structure, drying and calcining the same to complete deposition of a surface coating ingredient, immersing and maintaining in an electroless plating solution containing a first catalyst ingredient comprising at least one element selected from a group consisting of Pt, Pd and Ir at a temperature of from 30° to 80° C. for about 30 hours to thereby precipitate a predetermined amount of the first catalyst ingredient, and then washing with water and drying to provide the catalyst. A process for producing a two-component catalyst by an electroless plating method is carried out, in a similar manner, i.e., by immersing and maintaining a support having an integral structure with a surface coating ingredient deposited thereon in an electroless plating solution of a catalyst ingredient comprising at least one element selected from Au and Ag to thereby deposit a predetermined amount of the second catalyst ingredient, washing and drying the same, immersing and maintaining again in an electroless plating solution of a first catalyst ingredient, depositing a predetermined amount of the first catalyst ingredient, and applying water washing to complete the catalyst.

For the method of treating exhaust gases using the catalyst according to the present invention, the treating temperature is an important factor from a practical viewpoint and is from 150° to 280° C. When treatment is carried out by depositing the catalyst on a filtration material for a bag filter material, the treatment is preferably conducted at a temperature of from 150° to 230° C. in view of the limited temperature range of the material used for the filtration material.

The oxygen concentration in gases to be treated can be 1% by volume or greater. The catalyst carried on a support having an integral structure and the filtration material with a catalyst for a bag filter are used in a filling amount so that gases are passed at such a space velocity (SV) and linear velocity that the concentration of dioxines in the exhaust gases at a treating temperature is maintained at less than 0.5 ng/Nm³, desirably, at less than 0.1 ng/Nm³, converted as international toxicity equivalent concentration as international aimed value.

Dioxines as an object to be eliminated in exhaust gases are present in an order of ng/Nm³, while organic chlorine compounds and organic compounds as precursors for dioxines are present in the order of µg/Nm³, both of which are extremely small amounts. Since their concentration is so low, detailed reaction mechanisms have not yet become apparent. It is supposed that various reactions participate in a complicated manner on the surface of the catalyst, such as complete oxidative reaction, oxidative dehydrogenation reaction, dechlorination reaction, isomerization reaction, and disproportionating reaction.

It has been reported, for example, in the complete oxidative reaction that dioxines are decomposed into water, carbon dioxide, hydrogen chloride; and in dechlorination reaction that dioxines are formed by polycondensation from two molecules of 2,4,5-trichlorophenol or alkali salts thereof.

As the elimination method, elimination by complete oxidation is most preferred but dechlorination can be used in which chlorine is removed from dioxine skeletons or aromatic rings are disconnected and partially oxidized into less toxic or non-toxic molecules.

Existing catalysts, particularly catalysts containing oxides such as V, W and Ce, have drawbacks which make them more liable to be converted into chlorides; noble metal catalysts in exhaust gases containing HCl which provide less decomposition activity, such as oxidation activity and dechlorination activity, at a low temperature to substances such as dioxines having a relatively large molecule weight and high boiling point, and which tend to cause isomerizing activity or polymerizing activity. As a specific example, results of a measurement of inlet and outlet gases to a catalyst layer in an elimination test by oxidization for exhaust gases from municipal waste incineration plants are shown in Tables 3 and 6 and are described below. It is apparent that, among dioxines in the outlet gases, hexa- or higher chlorides of PCDDs and PCDFs are increased and dioxines of strong toxicity are formed from compounds which are not dioxines by chlorination or polymerization of precursors.

Figure 1:
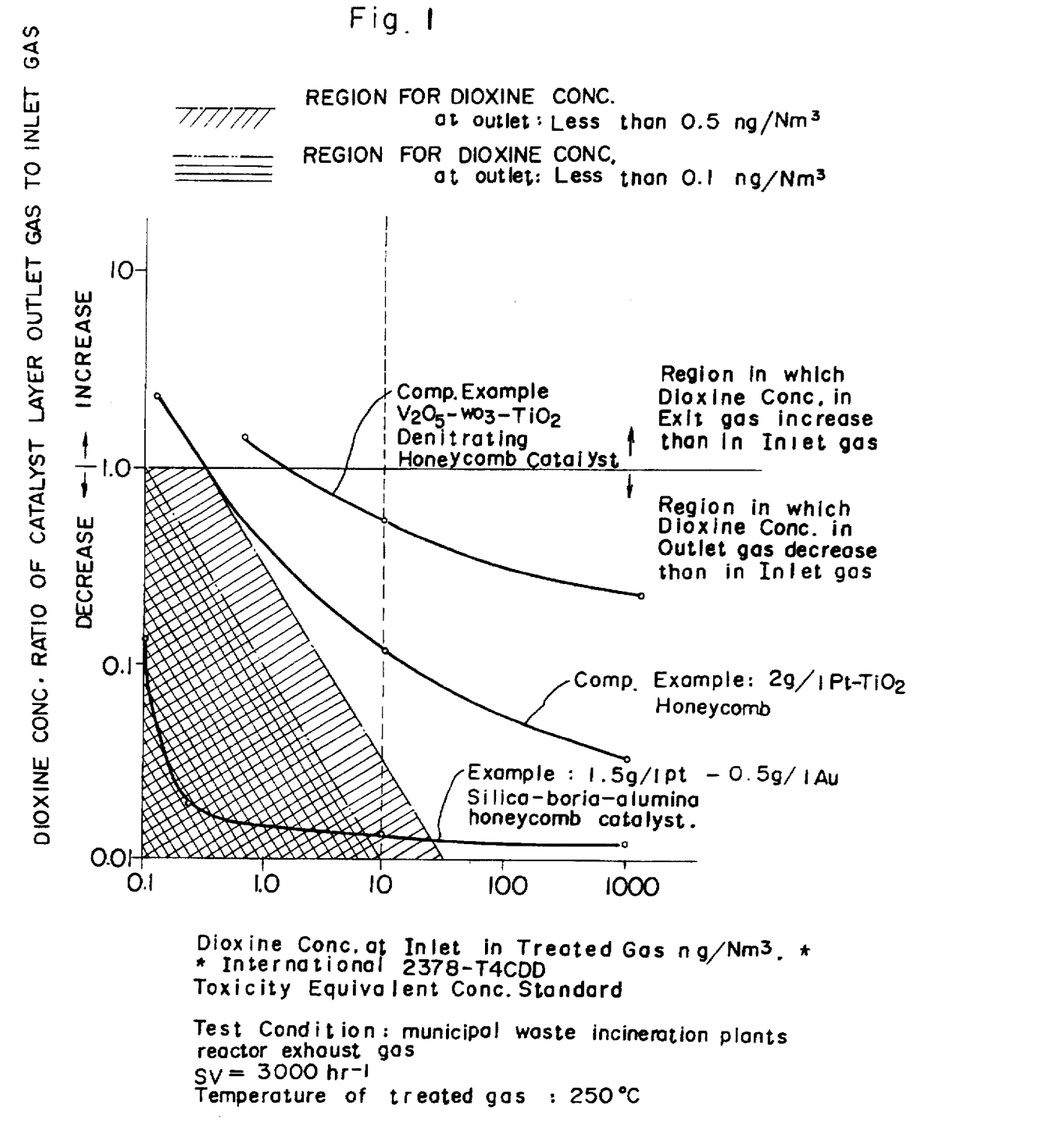
FIG. 1 illustrates a comparison between the concentration of dioxines in exhaust gases at the inlet and the purifying performance for each of the catalysts.
Figure 2:
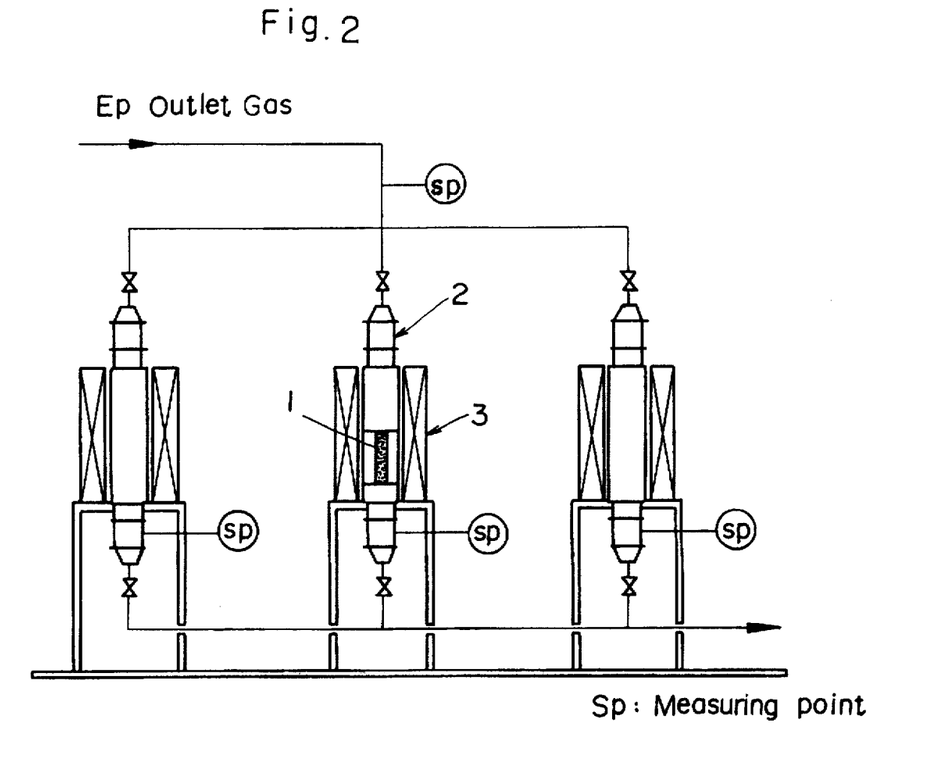
FIG. 2 is a schematic view of an experimental device.
Figure 3:
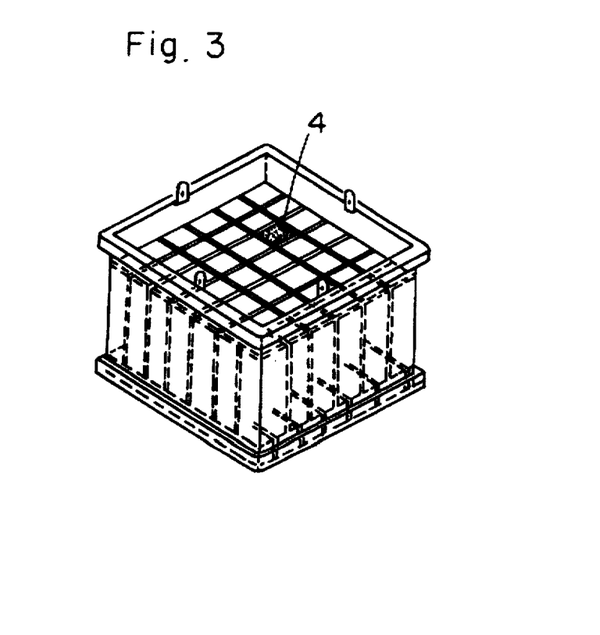
FIG. 3 is a perspective view illustrating a structure of a honeycomb-shaped catalyst-packed unit.
Figure 4:
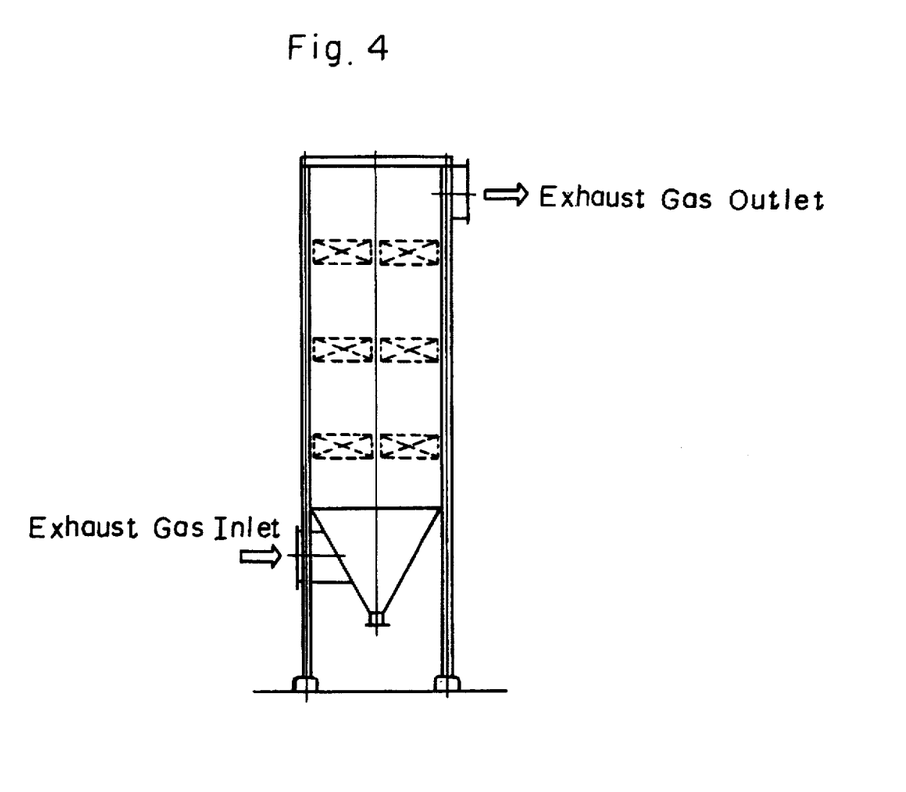
FIG. 4 illustrates an example of a catalyst reaction column.
Figure 5:
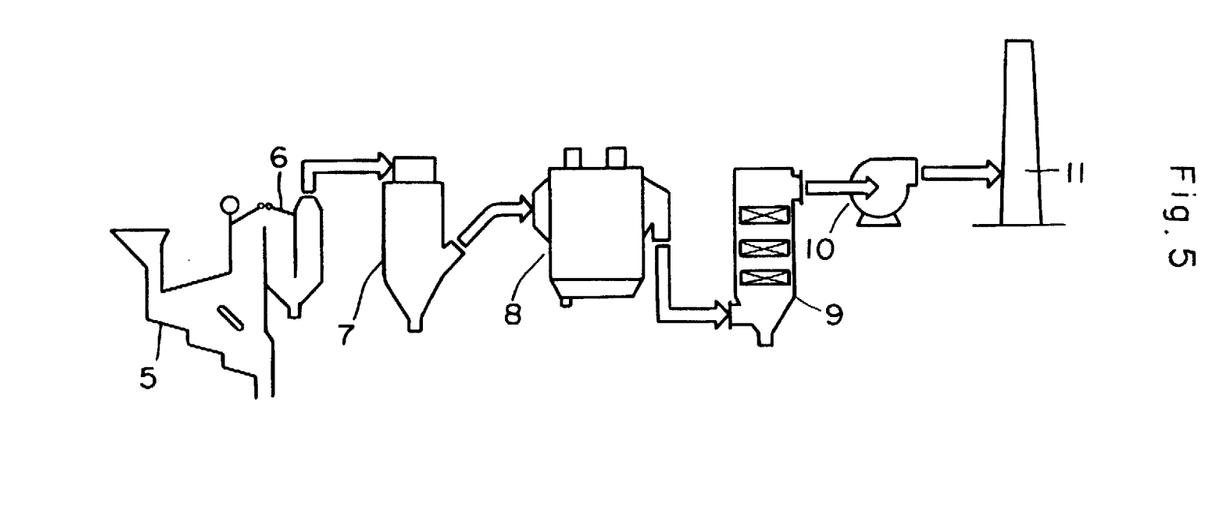
FIG. 5 is a flow chart for treating exhaust gases illustrating an example attached to a municipal waste incineration plant.
Figure 6:
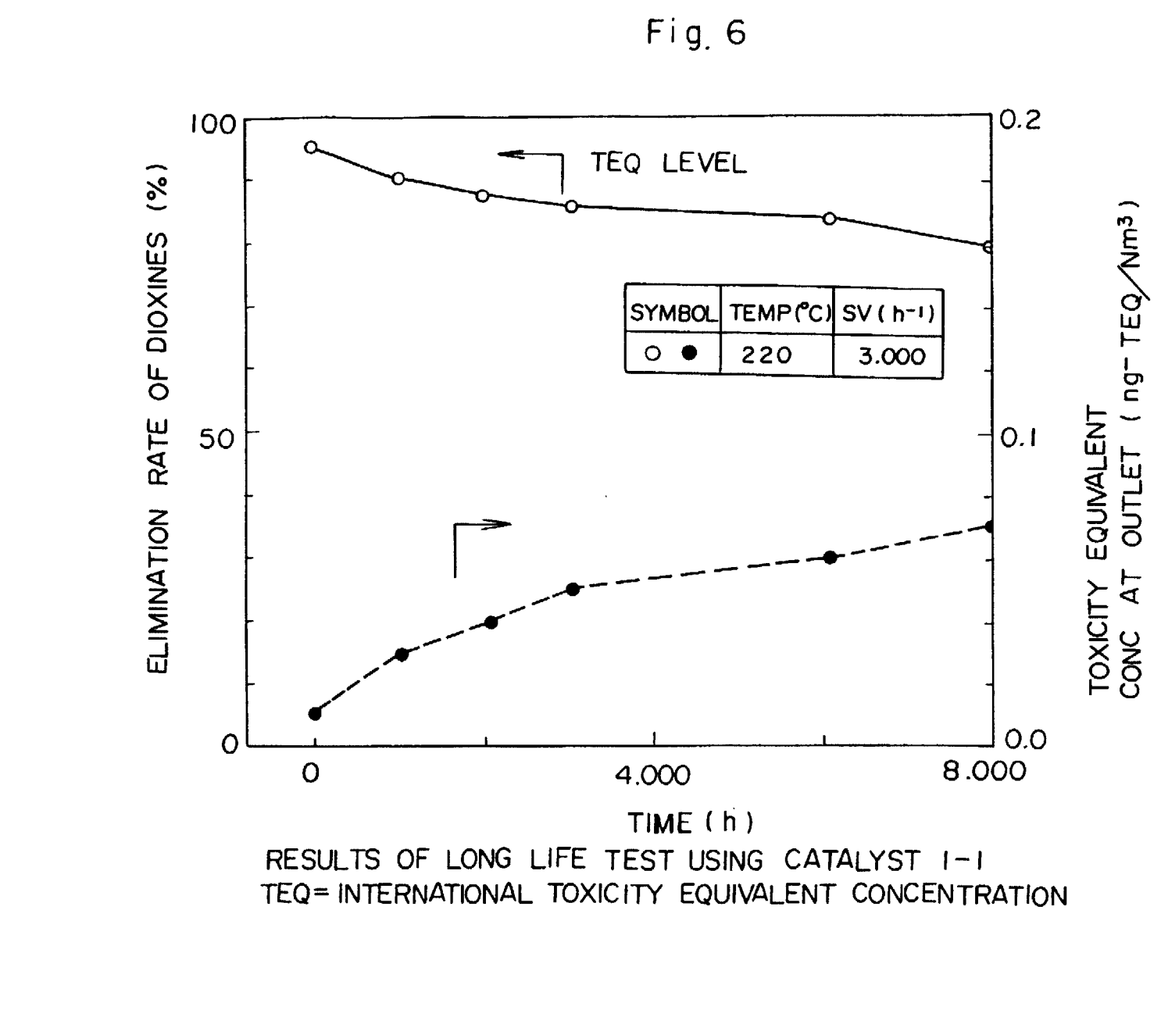
FIG. 6 sets forth results of long life test using catalyst 1—1 in a municipal waste incineration plant reactor exhaust gas.

FIG. 1 illustrates the relationship between the concentration of dioxines in inlet gases (on abscissa) and a ratio of concentration of dioxines at the outlet to the concentration of dioxines at the inlet (on ordinate) in the case of conducting an elimination test by oxidative decomposition of exhaust gases from municipal waste incineration plants by using a conventional catalyst and a catalyst according to the present invention deposited on a commercially available cordierite. It can be seen that elimination by oxidative decomposition of exhaust gases containing dioxines at a relatively low concentration is insufficient and that dioxines increase in the catalyst layer depending on the concentration level of dioxines in the prior art catalyst. That is, it is necessary for the catalyst to have a characteristic of progressing the decomposition reaction of dioxines present in the exhaust gases even at a low temperature and not progressing, i.e., suppressing, the reaction of forming dioxines from precursors, that is, a selectivity of showing a high decomposition activity at a low temperature while retaining the ability to form dioxines from precursors for dioxines contained in the exhaust gases as little as possible. The selectivity is more important as the concentration of dioxines is lower and is a feature necessary in the case of requiring a high purification ratio.

A catalyst containing only the first catalyst ingredient using a specified surface coating ingredient or a catalyst comprising two components by further adding the second catalyst ingredient according to the present invention has such a necessary characteristic. For example, catalysts comprising such catalyst ingredients deposited on commercially available cordierite honeycombs are shown in Example 2 and Table 4 described below. It can be seen that the catalysts eliminate dioxines in the exhaust gases together with PCDDs and PCDFs with no substantial relation to the structure of reactants and, as a result, show excellent oxidative decomposition activity at low temperatures.

The support has an integral structure which is a honeycomb structure or a three-dimensional network structure.

The supports comprise cordierite ($2SiO_2$—$2Al_2O_3$—$5MgO$); mullite ($2SiO_2$—$3Al_2O_3$); silica-boria-alumina composite oxide (honeycomb exclusion product from a powder sintered at 1000° C. for more than 3 hours); ceramics, such as α-alumina, alumina titanate, spodumene and magnesium; honeycomb or formed product made of activated carbon or carbon graphite-or acid-resistant metal, such as iron-based alloy, nickel-based alloy, chromium-based alloy or copper-based alloy having excellent mechanical and physical strength. Since these materials have no substantial surface area or pores in themselves, they can not carry the catalyst. Accordingly, it is preferred to use them by depositing, on the surface thereof, an acid resistant surface coating ingredient, or an acid resistant surface coating ingredient carrying the catalyst ingredient, having a large surface area. Among them, a honeycomb structure comprising cordierite is inexpensive and most preferred.

The number of cells in a honeycomb structure or a three-dimensional network structure is preferably from 10 to 400 cells per one square inch. If the number of cells is less than 10, the size of a unit cell is so large that contact of reactants in the gases to be treated is poor and they are left in an insufficiently reacted state. On the other hand, if the number of cells exceeds 400, through holes tend to become clogged due to powdery dusts. For exhaust gases containing powdery dusts in a relatively large amount, such as exhaust gases from an incineration plant, a support having an integral structure with a number of cells per square inch of less than 100 is used from a practical point of view. There is no particular restriction on the filtration material for a bag filter and materials generally available in the market, such as glass fibers, teflon-type felts or polyamide fibers, are preferred.

The silica-boria-alumina composite oxide preferably comprises from 4 to 20% by weight of silica ($SiO_2$), from 3 to 10% by weight of boria ($B_2O_3$) and a balance of alumina ($Al_2O_3$). ($SiO_2+B_2O_3+Al_2O_3=100\%$ by weight) as converted into oxides, which is not a mere mixture of silica, boria and alumina, but is formed as a so-called ternary composite oxide which can provide a unique physical property.

Zeolite with a silica-to-alumina molar ratio of more than 30 is preferably ZSM-5, mordenite or an ultra-stable Y-type (USY) zeolite of a relatively high acid resistance, particularly, an ultra-high stable Y-type zeolite with a silica-to-alumina molar ratio of more than 50. The ultra-stable Y-type zeolite is a stabilized Y-zeolite obtained by applying an acid treatment to zeolite to leach out $Al_2O_3$ and develop a preferred characteristic by forming a binary composite oxide. The zeolite can be synthesized or a commercially available zeolite can be used. Alternatively, meta silicate obtained by substituting transition metals in the zeolite can also be used.

The silica-boria-alumina composite oxide, and the zeolite with a silica-to-alumina molar ratio of more than 30, are so-called solid acids which have a remarkable acidity not found in each of the individual constituent oxides and have a large surface area, such as more than 300 m²/g as the BET specific surface area. The silica-boria-alumina composite oxide and the zeolite with a silica-to-alumina molar ratio of more than 30 are preferably used by previously calcining at a temperature of from 700° to 1200° C. for 1 to 12 hours, and preferably, at a temperature of from 700° to 1000° C. for three hours, in atmospheric air to thereby further improve the acid resistance.

The silica-boria-alumina composite oxide is obtained, for example, by forming an alumina hydrate slurry by hydrolysis of an aqueous solution of aluminum sulfate and an aqueous solution of sodium aluminate, adding an aqueous solution of sodium silicate to obtain a slurry of alumina-silica hydrate, filtration and washing to form an alumina-silica hydrate cake, adding and sufficiently mixing an aqueous solution of ortho-boric acid in such an amount as to provide a predetermined amount of boria, spray-drying the thus obtained alumina-silica-boron mixed hydrate, calcining at a temperature of from 600° to 800° C., and pulverizing into an average grain size of about 25 µm. Although this can be used as is, the alumina-silica-boron mixed hydrate is preferably kneaded under heating in a kneader with a heating jacket, extrusion molded from a molding machine having a die of a desired shape, dried at a temperature of from 80 to 120° C., calcined at a temperature of from 600°–1100° C., and pulverized into a powder for use.

For preparing a mordenite ultra-stable Y-type zeolite with a silica-to-alumina molar ratio of more than 30, a Si source can be selected from inorganic silicon compounds, such as colloidal silica, water glass, silicon tetrachloride and silica gel, as well as organic silicon compounds such as tetraethyl silicate. Although the raw materials can contain a trace amount of impurities or inclusions, they provide no problem unless they result in a significant effect on the resultant physical property. Mordenite can be synthesized, for example, by a method of adding a small amount of boehmite-type alumina powder to a mixed liquid of sodium silicate and purified water to which diluted sulfuric acid is added and stirred sufficiently, followed by adding an aqueous solution of tetraethyl ammonium bromide (TEABr), further stirring and maintaining in an autoclave at 170° C. for about 85 hours. Subsequently, the synthesized product is filtered and washed followed by drying at 120° C. over one night. The molar ratio of silica to alumina is controlled by the amount of sodium silicate and alumina used. Further, the ultra-stable Y-type zeolite is produced, for example, by adding sodium silicate to an aqueous solution of sodium aluminate in sodium hydroxide and aged for three hours, to which sodium silicate is admixed, followed by again adding an aqueous solution of sodium aluminate in sodium hydroxide to the mixed solution, further mixing, dropping therein 50% concentrated sulfuric acid and stirring sufficiently, stirring and maintaining under heating at 150° C. for 24 hours in an autoclave to synthesize the zeolite, filtering, washing the same and drying at 120° C. The resultant zeolite is refluxed in an aqueous solution of 1N HCl for 80 hours, refluxed to leach alumina and then filtered and cleaned again. The molar ratio of silica to alumina is controlled depending on the amount of sodium silicate and sodium aluminate used.

As the raw material for the first catalyst ingredient, particles of elements, oxides and hydroxides of Pt, Pd and Ir are used. In addition, there are also used, for example, chloroplatinic acid, alkali chloroplatinate, ammonium chloroplatinate and ammine platinum chloride as Pt salts. Palladium nitrate, palladium chloride, chloro-palladic acid, alkali chloropalladate, ammonium chloro-palladate and amine palladium chloride as Pd salts. Chloro-iridic acid, alkali iridate, ammonium iridate and ammine iridium chloride as Ir salts. As the raw material for the second catalyst ingredient, particles of elements, oxides or hydroxides of Au, Ag, Cu, Fe, Sb, Se, Te and Ta are used. In addition, there are also used, for example, chloroauric acid, alkali chloroaurate or potassium cyanoaurate as Au salts. Silver nitrate, silver fluoride, silver cyanate or silver perchlorate as Ag salts. Copper nitrate, copper chloride and copper sulfate as Cu salts. Iron nitrate, iron halide and iron sulfate as Fe salts. Sb salt, for example, antimony halide. Se salt, for example, selenium oxide and selenium halide. Te salt, for example, telluric acid and tellurium halide. Ta salt, for example, alkali tantalate. The organic salts of the raw materials are collectively referred to a resinates or resinoids and can also be used dissolved in organic solvents, such as terpinol.

If the concentration of the first catalyst ingredient is lower than the above specified range, the low temperature activity is lost. On the other hand, if the concentration is higher than the above specified range, it is economically inadvantageous. If the concentration of the second catalyst ingredient is lower than the above specified range, the selectivity is lowered, while the decomposition activity is lowered if the concentration is higher.

A catalyst carrying the first catalyst ingredient can be used after a reducing treatment. The reducing treatment includes a wet reducing method and a dry reducing method. As the wet reducing method, a conventional reducing method using an aqueous solution, for example, of formalin, hydrazine, oxalic acid or sodium borohydride (SBH), at a temperature of from 10° to 95° C. can be used. The dry reducing method is conducted by using a reducing gas, such as a hydrogen gas or carbon monoxide or such gas diluted with nitrogen, at a temperature of from 150° to 600° C., preferably, 200° to 500° C. Further, it is preferred to settle the element by the reducing treatment and then to remove insoluble residual impurities by water washing to improve the low temperature activity.

In the gas system to be treated, a step of diffusing and adsorbing reactants to the surface of the catalyst is important since the reactants are contained in an extremely small amount. Therefore, it is effective as a countermeasure to provide unevenness in a contact surface between the gas and the surface to provide disturbances which will break wall film. Then, a granular or acicular substance of 0.01 to 0.5 mm in size is added by 1 to 20% by weight based on the deposition layer solids content to the coating layer at the surface. Specifically, the substance is granules or pulverizates of silica-boria-alumina composite oxide, zeolite, titania, zirconia, silica, α-alumina, activated carbon or carbon graphite; and acicular substances such as whiskers of aluminum titanate, potassium titanate and SiC, glass fibers, alumina fibers, alumina-silica fibers, activated carbon fibers or carbon graphite fibers. Addition of the acid resistant fibrous material increases the adhesion of the coating layer and is advantageous particularly in the case of using a filter by coating the catalyst ingredient.

In the case of using the added slurry of granular or acicular material, the slurry is added after formation by from 1 to 20% by weight based on the dry solids content of the coating layer and then uniformly mixed by a stirrer. The granular or acicular material itself can also be used by being formed into a catalyst in the same manner as described above.

In the treating method according to the present invention, the treating temperature, as described above, can be conducted within the guidelines of the Ministry of the Health and Welfare by restricting the upper limit of the treating temperature for the exhaust gases to 280° C. If the temperature is lower than 150° C., the elimination effect is poor and, in addition, hindrance of adsorption of the object to be eliminated is undesirably increased due to adsorption of steams, HCl or $SO_x$ present in the exhaust gases.

For the size of the filling catalyst, the cross-section or length can be determined by taking into consideration the place in which it is to be installed. The facility utilizing the treating method of the present invention can naturally be applied for denitration by the catalyst according to the present invention and can be used alone. However, in the case of using the denitrating device together with the exhaust gas treatment, it is advantageous to install the facility downstream of the denitrating catalyst layer relative to the gas stream to be treated.

There is no particular restriction as described above on the type of reactor employed and conventional reactors, such as a fixed bed or moving bed reactor, can be applied. In the case of exhaust gas treatment for incineration plants, since exhaust gases contain a great amount of dust and have a high possibility of clogging, use of a reactor having a honeycomb catalyst capable of easily adjusting openings depending on the amount of the dust is preferred.

As described above, the catalyst according to the present invention has various advantages as described below: (1) suffers less from HCl poisoning in the decomposition reaction and can maintain a high activity at a low temperature, (2) has a high selective activity of suppressing a reaction of forming dioxines from precursors in gases in which the precursors for dioxines are present together, while decomposing dioxines present initially, and in particular, shows a high elimination rate of dioxines in the case where the concentration of dioxines in gases to be treated is at a relatively low level of less than 1 $ng/Nm^3$, converted as the international toxicity equivalent concentration, and (3) suppressing the oxidizing activity of converting coexistent $SO_x$ into $SO_3$, and $NH_3$ into $NO_x$, and (4) has a long practical working life.

DESCRIPTION OF PRESENTLY PREFERRED EMBODIMENTS

Description is now made of examples of the present invention.

EXAMPLE 1

100 ml of a mixed aqueous solution of chloroplatinic acid ($H_2PtCl_6$) containing Pt at a predetermined concentration and a chloroauric acid ($HAuCl_4$) containing Au at a predetermined concentration was added to, while stirring, 270 g of a silica-boria-alumina composite oxide powder having an average grain size of 15 μm comprising 10% by weight of silica, 5% by weight of boria and a balance of alumina being converted as oxides and dried at 110° C. for 12 hours. The mixture was then calcined at 500° C. for three hours in atmospheric air to prepare a powdery catalyst comprising a silica-boria-alumina composite oxide of 2.5 wt% Pt amd 0.83 wt% Au. 280 g of the catalyst, 420 ml of purified water and 10 ml of acetic acid were pulverized in a ball mill for 6 hours into an average grain size of 5 μm. Further, a small amount of purified water was added into the resultant slurry to adjust the specific gravity to 1.32 g/ml. A commercially available cordierite honeycomb was then immersed for 10 secs. into the slurry. The honeycomb had a cell number of 30 cpi$^2$ and a volume of 307 ml with a cross-section of 32 mm×32 mm and a length of 300 mm. The honeycomb was taken out of the slurry and excess slurry was removed from the honeycomb by an air stream. The honeycomb was then dried at 100° C. for 12 hours in an electric drier, and baked at 500° C. for one hour in atmospheric air to obtain a honeycomb catalyst 1—1 with a solid deposition of 60 g/l and carrying Pt at 1.5 g/l liter catalyst and Au at 0.5 g/l liter catalyst.

Using the thus obtained catalyst 1—1, an elimination test by oxidative decomposition was conducted for polychlorodibenzo dioxines (PCDDs) and polychloro-dibenzofurans (PCDFS) in exhaust gases from a municipal waste incineration plant under conditions shown in Table 1.

TABLE 1

| Specification for Test Incinerator Facility | |
|---|---|
| Exhaust Gas: | Exhaust gas from municipal waste incineration plant |
| Furnace Type: | Stoker furnace |
| Property of | Amount of soot - less than 0.03 g/Nm$^3$ |
| Exhaust Gas: | Sulfur oxide (SOx) - less than 30 ppm |
| | Hydrogen chloride (HCl) - less than 80 ppm |
| | Nitrogen oxide (Nox) - less than 100 ppm |
| Treating Amount: | 125 t/day |
| Cooling System: | Boiler type |
| Exhaust Gas (Pre) | Semi-dry noxious gas removing facility |
| Treating Method: | and electric dust precipitator |
| Test condition: | |
| Gas temperature at the inlet of catalyst layer: | 250° C. |
| Space velocity (hr$^{-1}$): | 3,000 |

The results are shown in Tables 2 and 4.

EXAMPLE 2

Using the same procedures as in Example 1, a silica-boria-alumina composite oxide (comprising 10% silica, 5% boria and a balance of alumina) carrying two ingredients of Pt and Ag, by using chloroplatinic acid (H$_2$PtCl$_6$) for Pt and silver nitrate (AgNO$_3$) for Ag in the second catalyst ingredient, was deposited on a cordierite honeycomb substrate having a cell number of 30 cpi$^2$, to obtain a honeycomb catalyst 1–2 carrying Pt at 1.5 g/l liter catalyst and Ag at 0.5 g/l liter catalyst. An elimination test by oxidative decomposition was carried out for the catalyst 1–2 in the same manner as in Example 1. The results are shown in Table 2.

EXAMPLE 3

Using the same procedures as in Example 1, a silica-boria-alumina composite oxide (comprising 10% silica, 5% boria and a balance of alumina) carrying two ingredients of Pt and Te, by using chloroplatinic acid (H$_2$PtCl$_6$) for Pt and telluric acid (H$_6$TeO$_6$) for Te in the second catalyst ingredient, was deposited on a cordierite honeycomb substrate having a cell number of 30 cpi$^2$, to obtain a honeycomb catalyst 1–3 carrying Pt at 1.5 g/l liter catalyst and Te at 0.5 g/l liter catalyst. An elimination test by oxidative decomposition was carried out for the resultant catalyst 1–3 in the same manner as in Example 1. The results are shown in Table 2.

EXAMPLE 4

Using the same procedures as in Example 1, a silica-boria-alumina composite oxide (comprising 10% silica, 5% boria and a balance of alumina) carrying only Pt was deposited on only a cordierite honeycomb substrate having a cell number of 30 cpi$^2$, to obtain a honeycomb catalyst 1–4 carrying Pt at 2.0 g/l liter catalyst. An elimination test by oxidative decomposition was carried out for the resultant catalyst 1–4 in the same manner as in Example 1. The results are shown in Tables 2 and 4.

EXAMPLE 5

Using the same procedures as in Example 1, a commercially available USY zeolite (silica/alumina molar ratio 80, calcined at 800° C. for three hours) carrying two ingredients of Pt and Au was deposited to a cordierite honeycomb substrate having a cell number of 30 cpi$^2$, to obtain a honeycomb catalyst 1–5 carrying Pt at 1.5 g/l liter catalyst and Au at 0.5 g/l liter catalyst. An elimination test by oxidative decomposition was carried out for the resultant catalyst 1–5 in the same manner as in Example 1. The results are shown in Table 2.

EXAMPLE 6

Using the same procedures as in Example 1, a commercially available USY zeolite (silica/alumina molar ratio 80, calcined at 800° C. for three hours) carrying Pt at 1.5 g/l liter catalyst and Au at 0.5 g/l liter catalyst, was deposited by an electroless plating method on a cordierite honeycomb substrate having a cell number of 30 cpi$^2$, to obtain a honeycomb catalyst 1–6. An elimination test by oxidative decomposition was carried out for the resultant catalyst 1–6 in the same manner as in Example 1. The results are shown in Table 2.

EXAMPLE 7

Using similar procedures to those in Example 1, 8.33% by weight of Pd and 1.67% by weight of Ag were carried by a cordierite honeycomb substrate, having a cell number of 30 cpi$^2$, using palladium nitrate (Pd(NO$_3$)$_2$) for Pd and silver nitrate (AgNO$_3$) for Ag, to prepare a silica-boria-alumina composite oxide. A slurry was prepared in the same manner as in Example 1 using the catalyst and the slurry used to obtain a honeycomb catalyst 2–1 carrying Pd at 5 g/l liter catalyst and Ag at 1 g/l liter catalyst. Using the catalyst 2–1, an elimination test by oxidative decomposition was carried out in the same manner as in Example 1. The results are shown in Tables 2 and 4.

EXAMPLE 8

Using the same procedures as in Example 7, a silica-boria-alumina composite oxide (silica 10%, boria 5%, and a balance of alumina) carrying two ingredients of Pd and Au, using palladium nitrate (Pd(NO$_3$)$_2$) for Pd and chloroauric acid ($HAuCl_4$) for the Au as the second catalyst ingredient, was deposited onto a cordierite honeycomb substrate having a cell number of 30 $cpi^2$ to obtain a honeycomb catalyst 2—2 carrying Pd at 5.0 g/1 liter catalyst and Au at 1.0 g/1 liter catalyst. An elimination test by oxidative decomposition was conducted in the same manner as in Example 1 for the resultant catalyst 2—2. The results are shown in Table 2.

EXAMPLE 9

Using the same procedures as in Example 1, a silica-boria-alumina composite oxide (silica 10%, boria 5%, and a balance of alumina) carrying two ingredients of Pd and Te, using palladium nitrate ($Pd(NO_3)_2$) for Pd and telluric acid ($H_6TeO_6$) for the Te as the second catalyst ingredient, was deposited on a cordierite honeycomb substrate having a cell number of 30 $cpi^2$ to obtain a honeycomb catalyst 2–3 carrying Pd at 5.0 g/1 liter catalyst and Te at 1.0 g/1 liter catalyst. An elimination test was conducted by oxidative decomposition in the same manner as in Example 1 for the resultant catalyst 2–3. The results are shown in Table 2.

EXAMPLE 10

Using the same procedures as in Example 7, a silica-boria-alumina composite oxide (10% silica, 5% boria, and a balance of alumina) carrying Pd, using palladium nitrate ($Pd(NO_3)_2$), was deposited on a cordierite honeycomb substrate having a cell number of 30 $cpi^2$ to obtain a honeycomb catalyst 2–4 carrying Pd at 7.0 g/1 liter catalyst. An elimination test was conducted by oxidative decomposition in the same manner as in Example 1 for the resultant catalyst 2–4. The results are shown in Table 2.

EXAMPLE 11

Using the same procedures as in Example 1, a silica-boria-alumina composite oxide (silica 10%, boria 5%, and a balance of alumina) carrying two ingredients of Ir and Au, using iridium chloride ($IrCl_3$) for Ir and chloroauric acid ($HAuCl_4$) for Au as the second catalyst ingredient, was deposited on a cordierite honeycomb substrate having a cell number of 30 $cpi^2$ to obtain a honeycomb catalyst 3–1 carrying Ir at 3.0 g/1 liter catalyst and Au at 1.0 g/1 liter catalyst. An elimination test was conducted by oxidative decomposition in the same manner as in Example 1 for the resultant catalyst 3–1. The results are shown in Table 2.

EXAMPLE 12

Using the same procedures as in Example 1, a silica-boria-alumina composite oxide (silica 10%, boria 5%, and a balance of alumina) carrying two ingredients of Ir and Ag, using iridium chloride ($IrCl_3$) for Ir and silver nitrate ($AgNO_3$) for the Ag as the second catalyst ingredient, was deposited to a cordierite honeycomb substrate having a cell number of 30 $Cpi^2$ to obtain a honeycomb catalyst 3–2 carrying Ir at 3.0 g/1 liter catalyst and Ag at 1.0 g/1 liter catalyst. An elimination test was conducted by oxidative decomposition in the same manner as in Example 1 for the resultant catalyst 3–2. The results are shown in Table 2.

EXAMPLE 13

Using the same procedures as in Example 1, a silica-boria-alumina composite oxide slurry containing Pt and Au was deposited thinly on the surface of a filtration material for a bag filter, dried at 100° C., and calcined at 200° C. to obtain a filter material specimen with catalyst for a bag filter. An elimination test was carried out by oxidative decomposition in the same manner as in Example 1 for the resultant specimen. Substantially the same results as those in Example 1 were obtained.

EXAMPLE 14

An elimination test by oxidative decomposition was carried out using the honeycomb catalyst sample No. 1—1 of Example 1 carrying Pt at 1.5 g/1 liter catalyst and Au at 0.5 g/1 liter catalyst under the exhaust gas test conditions shown in Table 1 while lowering the gas temperature at the inlet of the catalyst layer to 220° C. The results are shown in Table 5.

Comparative Example 1

An elimination test by oxidative decomposition was carried out in the same manner as in Example 1 using a commercially available denitrating honeycomb catalyst 4 comprising $V_2O_5$-$WO_3$-$TiO_2$. Catalyst 4 was prepared by kneading a $TiO_2$ powder with a solution of V salt and W salt, mixing with a binder, extruding into a honeycomb shape having a cell number of 35 $cpi^2$ (corresponding to hole diameter 3.5 mm) into $V_2O_5$ and $WO_3$. The results are shown in Tables 3 and 6.

Comparative Example 2

A honeycomb catalyst 5 was obtained by carrying Pt at 2 g/1 liter catalyst to catalyst 4 obtained in Comparative Example 1. An elimination test by oxidative decomposition was carried out in the same manner as in Example 1 for catalyst 5. The results are shown in Tables 3 and 6.

Comparative Example 3

An elimination test by oxidative decomposition was carried out using the same procedures as in Example 1 for removing dioxines by oxidative decomposition together with denitration using a denitrating honeycomb catalyst 6, carrying Pt at 2 g/1 liter catalyst in the same manner as catalyst 5 obtained in Comparative Example 2, and adding gaseous ammonia ($NH_3/NO_x$=0.8 or greater). Results are shown in Tables 3 and 6. The denitrating ratio was 81.5%.

Comparative Example 4

A honeycomb catalyst 7 was prepared carrying Pd at 5 g/1 liter on the denitrating catalyst obtained in Comparative Example 1. An elimination test by oxidative decomposition was carried out in the same manner as in Example 1 for catalyst 7. The results are shown in Table 3.

Comparative Example 5

A honeycomb catalyst 8 carrying Ce at 4 g/1 liter catalyst on a commercially available titania honeycomb carrier having a cell number of 36 $cpi^2$ (corresponding to 4 mm pore size) was obtained. An elimination test by oxidizing or oxidative decomposition was carried out for the resultant catalyst 8 in the same manner as in Example 1. The results are shown in Table 3.

Comparative Example 6

A honeycomb catalyst 9 carrying Pt at 2.5 g/1 liter catalyst on a mullite laminate-type honeycomb coated with a commercially available titania with a cell opening of 36 $cpi^2$ was obtained. An elimination test by oxidative decomposition was carried out for catalyst 9. The results are shown in Table 3.

TABLE 2

The honeycomb is a cordierite having a cell number of 30 cell/inch square. The results are at the concentration of dioxines at the inlet in the gas to be treated of 10 ng/Nm$^3$, converted as international toxicity equivalent concentration. The gas temperature at the inlet of the catalyst layer is 250° C. The space velocity (hr$^{-1}$) is 3,000.

| Specimen No. | Elimination rate for dioxines (%) |
|---|---|
| 1-1 | 97 |
| 1-2 | 95 |
| 1-3 | 97 |
| 1-4 | 84 |
| 1-5 | 95 |
| 1-6 | 75 |
| 2-1 | 78 |
| 2-2 | 90 |
| 2-3 | 80 |
| 2-4 | 75 |
| 3-1 | 77 |
| 3-2 | 70 |

TABLE 3

| Specimen No. | State of concentration of dioxines in outlet gases |
|---|---|
| 4 | Increased from the inlet |
| 5 | " |
| 6 | " |
| 7 | " |
| 8 | " |
| 9 | Showing a 38% elimination ratio |

TABLE 5

Results for Measurement of Dioxines Concentrations
Unit: ng/Nm$^3$

| Catalyst | No. 1-1 | |
|---|---|---|
| Catalyst layer Temperature | 220° C. | |
| Measuring point | Inlet | Outlet |
| T$_4$CDD$_s$ | 0.71 | 0.26 |
| P$_5$CDD$_s$ | 0.85 | 0.10 |
| H$_6$CDD$_s$ | 0.57 | 0.076 |
| H$_7$CDD$_s$ | 0.32 | 0.058 |
| O$_8$CDD | 0.31 | 0.089 |
| PCDD$_s$ | 2.8 | 0.58 |
| T$_4$CDF$_s$ | 5.5 | 0.67 |
| P$_5$CDF$_s$ | 3.6 | 0.23 |
| H$_6$CDF$_s$ | 2.4 | 0.10 |
| H$_7$CDF$_s$ | 0.84 | 0.054 |
| O$_8$CDF | 0.20 | 0.037 |
| PCDF$_s$ | 13.0 | 1.1 |
| PCDD$_s$ + PCDF$_s$ | 16.0 | 1.7 |
|  | (0.25) | (0.01) |

Concentration: O$_2$ concentration converted as 12%

Numericals shown in ( ) represent international toxicity equivalent concentration

TABLE 4 unit: ng/Nm$^3$

| Catalyst Specimen No | 1-1 | | Catalyst Specimen No | 1-4 | | Catalyst Specimen No | 2-1 | |
|---|---|---|---|---|---|---|---|---|
| Catalyst layer temperature | 250° C. | | Catalyst layer temperature | 250° C. | | Catalyst layer temperature | 250° C. | |
| Measuring point | Inlet | Outlet | Measuring point | Inlet | Outlet | Measuring point | Inlet | Outlet |
| T$_4$CDD$_5$ | 0.62 | 0.013 | T$_4$CDD$_5$ | 0.71 | 0.12 | T$_4$CDD$_5$ | 0.13 | 0.35 |
| P$_5$CDD$_5$ | 0.71 | <0.01 | P$_5$CDD$_5$ | 0.85 | 0.13 | P$_5$CDD$_5$ | 0.71 | 0.36 |
| H$_6$CDD$_5$ | 0.59 | <0.01 | H$_6$CDD$_5$ | 0.37 | 0.19 | H$_6$CDD$_5$ | 0.13 | 0.19 |
| H$_7$CDD$_5$ | 0.58 | <0.01 | H$_7$CDD$_5$ | 0.32 | 0.15 | H$_7$CDD$_5$ | 1.7 | 0.23 |
| O$_8$CDD | 0.47 | 0.56 | O$_8$CDD | 0.31 | 0.14 | O$_8$CDD | 1.8 | 0.66 |
| PCDD$_5$ | 3.0 | 0.64 | PCDD$_5$ | 2.3 | 0.74 | PCDD$_5$ | 5.7 | 1.8 |
| T$_4$CDF$_5$ | 8.2 | 0.25 | T$_4$CDF$_5$ | 5.5 | 0.43 | T$_4$CDF$_5$ | 5.1 | 2.1 |
| P$_5$CDF$_5$ | 5.1 | <0.01 | P$_5$CDF$_5$ | 3.5 | 0.63 | P$_5$CDF$_5$ | 6.7 | 1.3 |
| H$_6$CDF$_5$ | 3.5 | <0.01 | H$_6$CDF$_5$ | 2.4 | 0.81 | H$_6$CDF$_5$ | 5.0 | 0.62 |
| H$_7$CDF$_5$ | 2.1 | <0.01 | H$_7$CDF$_5$ | 0.84 | 0.67 | H$_7$CDF$_5$ | 5.1 | 0.70 |
| O$_8$CDF | 0.41 | 0.20 | O$_8$CDF | 0.20 | 0.10 | O$_8$CDF | 2.4 | 0.33 |
| PCDF$_5$ | 19.0 | 0.45 | PCDF$_5$ | 13.0 | 2.7 | PCDF$_5$ | 24.0 | 5.0 |
| PCDD$_5$ + PCDF$_5$ | 22.0 | 1.1 | PCDD$_5$ + PCDF$_5$ | 18.0 | 3.4 | PCDD$_5$ + PCDF$_5$ | 30.0 | 6.8 |
|  | (0.31) | (<0.01) |  | (0.25) | (0.04) |  | (0.41) | (0.09) |

Concentration: O$_2$ concentration converted as 12%

Numericals shown in ( ) represent international toxicity equivalent concentration

TABLE 6 unit: ng/Nm³

| | Comparative Example 1 | | | Comparative Example 2 | | | Comparative Example 3 | |
|---|---|---|---|---|---|---|---|---|
| | V₂O₅—WO₃—TiO₂ Commercial denitrating Catalyst | | | Catalyst carrying 2.0 g Pt/ liter to Comp. Example 1 | | | Catalyst of Comp. Example 2 | |
| Catalyst Specimen No. | 4 | | Catalyst Specimen No. | 5 | | Catalyst Specimen No. | 6 | |
| Catalyst layer temperature | 250° C. | | Catalyst layer temperature | 250° C. | | Catalyst layer temperature | 250° C. | |
| Ammonia addition | Not added | | Ammonia addition | Not added | | Ammonia addition | added NH₃/NO_x molar ratio 0.8 | |
| Dioxine conc. | ng/Nm³ | | Dioxine conc | ng/NM³ | | Cioxine conc | ng/Nm³ | |
| Measuring point | Inlet | Outlet | Measuring point | Inlet | Outlet | Measuring point | Inlet | Outlet |
| T₄CDD₅ | 0.47 | 0.49 | T₄CDD₅ | 0.35 | 0.066 | T₄CDD₅ | 0.98 | 0.063 |
| P₅CDD₅ | 6.7 | 1.7 | P₅CDD₅ | 0.32 | 0.23 | P₅CDD₅ | 0.37 | 0.39 |
| H₆CDD₅ | 12 | 4.3 | H₆CDD₅ | 1.5 | 0.95 | H₆CDD₅ | 0.93 | 2.1 |
| H₇CDD₅ | 12 | 13 | H₇CDD₅ | 1.7 | 2.3 | H₇CDD₅ | 0.89 | 3.0 |
| O₈CDD | 5.3 | 8.3 | O₈CDD | 1.4 | 2.4 | O₈CDD | 0.61 | 2.7 |
| PCDD₅ | 42 | 23 | PCDD₅ | 5.3 | 5.9 | PCDD₅ | 4.3 | 8.3 |
| T₄CDF₅ | 10 | 2.9 | T₄CDF₅ | 0.85 | 0.43 | T₄CDF₅ | 2.3 | 0.39 |
| P₅CDF₅ | 9.6 | 3.4 | P₅CDF₅ | 1.0 | 2.4 | P₅CDF₅ | 1.3 | 1.5 |
| H₆CDF₅ | 7.4 | 20 | H₆CDF₅ | 2.1 | 3.5 | H₆CDF₅ | 1.0 | 5.0 |
| H₇CDF₅ | 5.3 | 29 | H₇CDF₅ | 3.3 | 15 | H₇CDF₅ | 0.92 | 7.1 |
| O₈CDF | 0.36 | 12 | O₈CDF | 0.74 | 6.6 | O₈CDF | 0.35 | 2.8 |
| PCDF₅ | 33 | 72 | PCDF₅ | 8.3 | 33 | PCDF₅ | 5.9 | 17 |
| PCDD₅ + PCDF₅ | 75 (0.35) | 100 (1.50) | PCDD₅ + PCDF₅ | 14 (0.15) | 39 (0.63) | PCDD₅ + PCDF₅ | 10 (0.09) | 25 (0.40) |

Concentration: $O_2$ concentration converted as 12%
Numericals shown in ( ) represent international toxicity equivalent concentration As can be seen from each of the Tables, it is apparent that installation of a catalyst device provides an undesired effect, or a lesser effect in the case where the concentration of dioxines is relatively low as in exhaust gases from recent entirely connected incineration plants, since the concentration of dioxines is higher in outlet gases than in inlet gases in the prior art. On the other hand, in the case of depositing a catalyst according to the present invention to a commercial cordierite honeycomb structure having 30 cells per one square inch, the catalyst can suppress the formation of dioxines from precursors for dioxines without reducing the performance of eliminating dioxines initially present in exhaust gases and thereby is capable of remarkably reducing the concentration of dioxines in the exhaust gases at the outlet of the catalyst layer. Further, the concentration of dioxines in the outlet gases is reduced for a long time to less than 0.5 ng/Nm³ and to less than 0.1 ng/Nm³, as international aimed value converted as the international toxicity equivalent concentration.

In the present invention, since the predetermined active ingredient is carried in a predetermined amount on a support, polychlorodibenzo-para-dioxines and polychlorodibenzofurans contained in exhaust gases can be effectively removed, and an oxidative decomposition catalyst having a long catalyst life can be provided which can be used as a catalyst filtration material deposited on a carrier having an integral structure, for example, a honeycomb structure, and on a filter for reducing dioxines present in exhaust gases at a concentration of less than 10 ng/Nm³, converted as the international toxicity equivalent concentration, at a low temperature of lower than 280° C. (which is at a treating temperature conforming to the guidelines of the Ministry of Health and Welfare) to a concentration of less than 0.5 ng/Nm³, desirably, to less than 0.1 ng/Nm³, converted as the international toxicity equivalent concentration aimed value, by eliminating the dioxines initially present by oxidative decomposition while suppressing the formation of dioxines from precursors based on the effect of the catalyst installed. A process for producing the catalyst using a support having an integral structure, and a method of using the catalyst by depositing the catalyst on at least one kind of support having an integral structure or a filtration material for a bag filter is also presented. The present invention can provide remarkable advantageous effects of providing a higher elimination ratio as compared with other existing elimination methods, of attaining low concentration of dioxines at the outlet, of reducing the scale of the reactor, of being installed in a newly installed facility as well as an existing facility, and of reducing the running cost and installation cost.

The present invention encompasses elimination of chlorodioxines by oxidative decomposition; oxidative elimination of polybromodibenzo-para-dioxines (PBDDS) and polybromobenzofurans (PBDFs) in exhaust gases, which have brought about problems in recent years, elimination of polychlorobiphenyl (PCB) in combustion exhaust gases and organic halogen compounds contained in exhaust gases, such as trichloroethylene, trichloroethane, dichloromethane, chlorophenols, halogenated hydrocarbons and methyl bromide; effective oxidative decomposition catalysts; a production process for providing the catalysts; and a treating method using the catalysts.

What is claimed is:

1. A catalyst for treating exhaust gases containing dioxines comprising at least one element selected from the group consisting of Ir and Ir oxides, in an amount of 0.1 to 10 g based on one liter of the catalyst; and a silica-boria-alumina composite oxide on which said at least one element is carried.

2. A catalyst for treating exhaust gases containing dioxines consisting essentially of as a first catalyst ingredient at least one element selected from the group consisting of Pt, Pd, Ir, Pt oxides, Pd oxides and Ir oxides, and as a second catalyst ingredient at least one element selected from the group consisting of Au, Ag, Cu, Fe, Sb, Se, Te and Ta, said first catalyst ingredient and said second catalyst ingredient being carried on a silica-boria-alumina composite oxide, and wherein said first catalyst ingredient is present in an amount of 0.1 to 10 g based on one liter of the catalyst and said second catalyst ingredient is present in an amount of 0.01 to 5 g based on one liter of the catalyst, and wherein said second catalyst ingredient is carried on said composite oxide in a ratio to said first catalyst ingredient of less than 1 on a weight basis.

3. A process for producing a catalyst for treating exhaust gases containing dioxines consisting essentially of spraying or dripping a homogeneous mixed solution or a homogeneous liquid dispersion of (1) raw material for a first catalyst ingredient or a first catalyst ingredient and (2) a second catalyst ingredient, onto a powdered silica-boria-alumina composite oxide while stirring said powdered composite oxide as treated with said homogeneous mixed solution or said homogeneous liquid dispersion to provide an admixture whereby said powdered composite oxide serves to carry said raw material or said first catalyst ingredient and said second catalyst ingredient; slurrifying said admixture and depositing such admixture onto a carrier substrate; wherein said first catalyst ingredient is at least one element selected from the group consisting of Pt, Pd, Ir, Pt oxides, Pd oxides and Ir oxides, and said second catalyst ingredient is at least one element selected from the group consisting of Au, Ag, Cu, Fe, Sb, Se, Te and Ta.

4. A process for producing a catalyst for treating exhaust gases containing dioxines consisting essentially of slurrifying a powdered silica-boria-alumina composite oxide; coating a resultant slurry of said powdered composite oxide onto a surface of a carrier substrate, followed by drying and baking of said carrier substrate to complete deposition of said composite oxide on said carrier substrate; subjecting said carrier substrate to immersion, spraying or ion exchange with a solution of (1) a raw material for a first catalyst ingredient or a first catalyst ingredient and (2) a second catalyst ingredient, successively or simultaneously, followed by drying and baking of the carrier substrate treated to cause said raw material or said first catalyst ingredient and said second catalyst ingredient to be carried by said carrier substrate; wherein said first catalyst ingredient is at least one element selected from the group consisting of Pt, Pd, Ir, Pt oxides, Pd oxides and Ir oxides, and said second catalyst ingredient is at least one element selected from the group consisting of Au, Ag, Cu, Fe, Sb, Se, Te and Ta.

5. A process for producing a catalyst for treating exhaust gases according to claim 3 or claim 4 wherein the carrier substrate is an integral honeycomb structure having a cell number of 10 to 400 cells per square inch, a three-dimensional network structure, or a filtration material for a bag filter.

6. A process for producing a catalyst for treating exhaust gases according to claim 3 wherein the admixture is carried on a filtration material as the carrier substrate in an amount of from 0.05 to 5% by weight based on the weight of the filtration material.

7. A process for producing a catalyst for treating exhaust gases according to claim 3 or claim 4 wherein the first catalyst ingredient is carried in an amount of from 0.05 to 5% by weight based on the weight of the carrier substrate and the second catalyst ingredient is carried in an amount of from 0.01 to 1.0% by weight based on the weight of the carrier substrate, and the second catalyst ingredient is present in a weight ratio to the first catalyst ingredient of less than 1.

8. A process for producing a catalyst for treating exhaust gases according to claim 4 wherein the carrier substrate is a filtration material for a bag filter and (1) the raw material for a first catalyst ingredient or the first catalyst ingredient and (2) the second catalyst ingredient are carried on the filtration material in an amount of from 0.5 to 5% by weight based on the weight of the filtration material.

* * * * *